2,770,537

N-1-NAPHTHYLPHTHALAMIC ACID HERBICIDAL COMPOSITIONS

Allen E. Smith, Oxford, Albert W. Feldman, North Haven, and Gracie M. Stone, Naugatuck, Conn., assignors to United States Rubber Company, New York, N. Y., a corporation of New Jersey No Drawing. Application October 27, 1954, Serial No. 465,151

11 Claims. (Cl. 71—2.4)

This invention relates to improvements in N-1-naphthylphthalamic acid herbicidal compositions.

Pre-emergence herbicides are applied to the soil surface before emergence of weeds, generally immediately after planting the seeds of the agronomic crop.

A basis for the action of pre-emergence herbicides is the difference in depth between the planted crop seeds and the weed seeds on the surface of the soil. Crop seeds are generally planted one to three inches deep and are somewhat protected from chemicals applied to the soil surface, while weed seeds generally germinate only in the top one-fourth inch of soil and are thus subject to much higher concentrations of the chemical during the germination period. To maintain as high a concentration of herbicide as possible near the soil surface, and also to avoid injury to the seeded crop which may be semi-sensitive to the herbicide, it is desirable to minimize downward movement of the chemical in the soil during rains or irrigation. Compounds of very low solubility do not necessarily resist leaching. For example, N-1-naphthylphthalamic acid and N-1-naphthylphthalimide are both substantially insoluble in water (less than 0.05% at 15° C.) yet the acid is quite mobile in soil while the imide resists leaching very well.

The purpose of the present invention is to decrease the soil mobility of the phthalamic acid herbicide, in order to increase residual weed control by maintaining a high concentration of the herbicide at the soil surface under wet conditions, and to minimize possible injury to the more deeply seeded crops.

We have found that when inorganic chemicals which contain ionizable hydrogen and which give a strong acid reaction in water are applied to the soil surface with N-1-naphthylphthalamic acid herbicide, the leaching tendency of the herbicide is greatly reduced. Examples of such acidic chemicals containing ionizable hydrogen are the free acids, e. g. sulfuric, hydrochloric, nitric, and phosphoric ($H_3PO_4$) acids, and alkali bisulfates, i. e., ammonium bisulfates and alkali-metal (e. g. sodium and potassium) bisulfates.

The amount of acidic chemical applied to the soil is not critical, and generally will be at least five times the amount of N-1-naphthylphthalamic acid applied. The acidic chemical may also be used as a diluent or fertilizer or serve some other secondary purpose, in which case the amount of the acidic chemical applied may be 100 or 1000 times the amount of the N-1-naphthylphthalamic acid. While the acidic chemical may be applied to the soil separately from the N-1-naphthylphthalamic acid herbicide, it is preferred to apply it as part of the herbicidal formulation. For example, where the N-1-naphthylphthalamic acid is applied as an aqueous spray, preferably with the aid of a surface-active dispersing agent to effect dispersion of the phthalamic acid in the water, the acidic chemical may be dissolved in the aqueous medium. Where the N-1-naphthylphthalamic acid is applied to the soil as a dust, as in admixture with a powdered solid carrier, such as the various mineral silicates, e. g. talc, pyrophillite and clays, the acidic chemical may be incorporated in the powdered formulation. If desired, the N-1-naphthylphthalamic acid and acidic chemical may be admixed with powdered solid carriers, such as mineral silicates, together with a surface-active dispersing agent so that a readily wettable powder may be obtained which may be applied directly to the soil, or which may be shaken up with water for spray or other liquid application to the soil. The mixture of N-1-naphthylphthalamic acid and acidic chemical may be applied to the ground by the aerosol method. Such formulations may, if desired, also contain fertilizers, fungicides, insecticides and soil-conditioners.

The following illustrates the invention. All parts and percentages referred to herein are by weight:

Example 1

One inch thick layers of a conventional sandy loam soil were placed in several Buchner type funnels. Aqueous dispersions of N-1-naphthylphthalamic acid containing a non-herbicidal surface-active dispersing agent (condensaton product of ethylene oxide with an alkylated phenol) were watered onto the surface of the soil in the funnels in amount corresponding to an application rate of about four pounds of N-1-naphthylphthalamic acid per acre. The first dispersion, which was the control or check, contained 0.95 part of N-1-naphthylphthalamic acid and 0.05 part of the dispersing agent in 1000 parts of water. The second and third dispersions contained 0.95 part of N-1-naphthylphthalamic acid and 0.05 part of the above dispersing agent in 1000 parts of water containing 10 parts and 30 parts of sulfuric acid, respectively, giving suspensions of the N-1-naphthylphthalamic acid in 1% and 3% sulfuric acid, respectively. A fourth dispersion contained 0.95 part of N-1-naphthylphthalamic acid and 0.05 part of the above dispersing agent in 1000 parts of water containing 30 parts of ammonium bisulfate ($NH_4HSO_4$).

An hour after the treatment of the soil samples with the herbicidal dispersions (the time was found not to be critical), an amount of water equivalent to one inch rainfall was applied to the soil surfaces. The moisture content of the soil was then reduced to field capacity by gravity and subsequent vacuum filtration. The filtrates were analyzed chemically to determine the amount of N-1-naphthylphthalamic acid herbicide removed. The percentage of the applied N-1-naphthylphthalamic acid washed through one inch of soil by one inch of water (i. e. percent leached) was then calculated. The percent of the applied N-1-naphthylphthalamic acid herbicide leached in the control dispersion of the herbicide in water was 58%. Other tests have shown that the percent of N-1-naphthylphthalamic acid leached is substantially the same for various application rates of the chemical. With the equivalent of a one-inch rain 50% to 60% of N-1-naphthylphthalamic acid is leached at various application rates from 2 to 8 pounds per acre. With the equivalent of a two-inch rainfall, the percent leaching at 2 to 8 pounds application rate is over 80%. The percent of the applied N-1-naphthylphthalamic acid leached in the dispersions of the herbicide in the 1% and 3% solutions of sulfuric acid was 10% and 5%, respectively. The percent of the applied N-1-naphthylphthalamic acid leached in the dispersion of the herbicide in the 3% solution of ammonium bisulfate was 6%. That the improvement in some way due to the hydrogen in the acidic chemicals and not to the alkali or acid radicals is shown by further similar tests in which the percent of the applied N-1-naphthylphthalamic acid that was leached where the herbicide was applied dispersed in 3% aqueous solutions of normal ammonium sulfate [$(NH_4)_2SO_4$] and calcium chloride, was 62% and 56%, respectively.

Example II

A dust formulation of one part of N-1-naphthylphthalamic acid in 99 parts of clay (Attaclay) was applied to the surface of a one inch layer of soil in a Buchner type funnel at a rate of application the same as Example I. A second dust of one part of N-1-naphthylphthalamic acid in 65 parts of clay and 34 parts of potassium bisulfate was similarly applied to the surface of the soil in a second Buchner type funnel. The soils were watered and otherwise treated as in Example I and the filtrates analyzed for N-1-naphthylphthalamic acid. The percent of the applied N-1-naphthylphthalamic acid leached from the first control formulation was 67%, whereas the percent of the applied N-1-naphthylphthalamic acid leached from the second formulation according to the present invention was 5%.

Having thus described our invention, what we claim and desire to protect by Letters Patent is:

1. A herbicidal composition containing a phytotoxic concentration of N-1-naphthylphthalamic acid, and material selected from the group consisting of sulfuric, hydrochloric, nitric and phosphoric acids, and alkali bisulfates in proportion sufficient to reduce leaching in the soil of said N-1-naphthylphthalamic acid, said composition being free of any basic material capable of reacting with such acidic inorganic chemical to neutralize it.

2. A herbicidal composition containing a phytotoxic concentration of N-1-naphthylphthalamic acid, and an alkali bisulfate in proportion sufficient to reduce leaching in the soil of said N-1-naphthylphthalamic acid, said composition being free of any basic material capable of reacting with such acidic inorganic chemical to neutralize it.

3. A herbicidal composition containing a phytotoxic concentration of N-1-naphthylphthalamic acid, and ammonium bisulfate in proportion sufficient to reduce leaching in the soil of said N-1-naphthylphthalamic acid, said composition being free of any basic material capable of reacting with such acidic inorganic chemical to neutralize it.

4. A herbicidal composition containing a phytotoxic concentration of N-1-naphthylphthalamic acid, and sulfuric acid in proportion sufficient to reduce leaching in the soil of said N-1-naphthylphthalamic acid, said composition being free of any basic material capable of reacting with such acidic inorganic chemical to neutralize it.

5. A herbicidal composition containing a phytotoxic concentration of N-1-naphthylphthalamic acid, and material selected from the group consisting of sulfuric, hydrochloric, nitric and phosphoric acids, and alkali bisulfates in proportion sufficient to reduce leaching in the soil of said N-1-naphthylphthalamic acid, said composition being free of any basic material capable of reacting with such acidic inorganic chemical to neutralize it, and said composition containing a surface-active wetting agent.

6. A herbicidal composition containing a phytotoxic concentration of N-1-naphthylphthalamic acid, and material selected from the group consisting of sulfuric, hydrochloric, nitric and phosphoric acids, alkali bisulfates in proportion sufficient to reduce leaching in the soil of said N-1-naphthylphthalamic acid, said composition being free of any basic material capable of reacting with such acidic inorganic chemical to neutralize it, and said composition containing a powdered solid carrier.

7. A herbicidal composition containing a phytotoxic concentration of N-1-naphthylphthalamic acid, and material selected from the group consisting of sulfuric, hydrochloric, nitric and phosphoric acids, and alkali bisulfates in proportion sufficient to reduce leaching in the soil of said N-1-naphthylphthalamic acid, said composition being free of any basic material capable of reacting with such acidic inorganic chemical to neutralize it, and said composition containing a surface-active wetting agent and a powdered solid carrier.

8. The method of controlling weeds in soil which comprises treating the soil before emergence of weeds with a phytotoxic amount of N-1-naphthylphthalamic acid, and material selected from the group consisting of sulfuric, hydrochloric, nitric and phosphoric acids, and alkali bisulfates in proportion sufficient to reduce leaching in the soil of said N-1-naphthylphthalamic acid, and in the absence of any added basic material capable of reacting with such acidic inorganic chemical to neutralize it.

9. The method of controlling weeds in soil which comprises treating the soil before emergence of weeds with a phytotoxic amount of N-1-naphthylphthalamic acid, and alkali bisulfate in proportion sufficient to reduce leaching in the soil of said N-1-naphthylphthalamic acid, and in the absence of any added basic material capable of reacting with such acidic inorganic chemical to neutralize it.

10. The method of controlling weeds in soil which comprises treating the soil before emergence of weeds with a phytotoxic amount of N-1-napthylphthalamic acid, and ammonium bisulfate in proportion sufficient to reduce leaching in the soil of said N-1-naphthylphthalamic acid, and in the absence of any added basic material capable of reacting with such acidic inorganic chemical to neutralize it.

11. The method of controlling weeds in soil which comprises treating the soil before emergence of weeds with a phytotoxic amount of N-1-naphthylphthalamic acid, and sulfuric acid in proportion sufficient to reduce leaching in the soil of said N-1-naphthylphthalamic acid, and in the absence of any added basic material capable of reacting with such acidic inorganic chemical to neutralize it.

References Cited in the file of this patent

UNITED STATES PATENTS 2,556,665     Smith et al. _____ June 12, 1951

OTHER REFERENCES

Pacheco: Bull. Soc. Chim. Biol.: 34 (1952), pp. 395–401.